Figure 1:
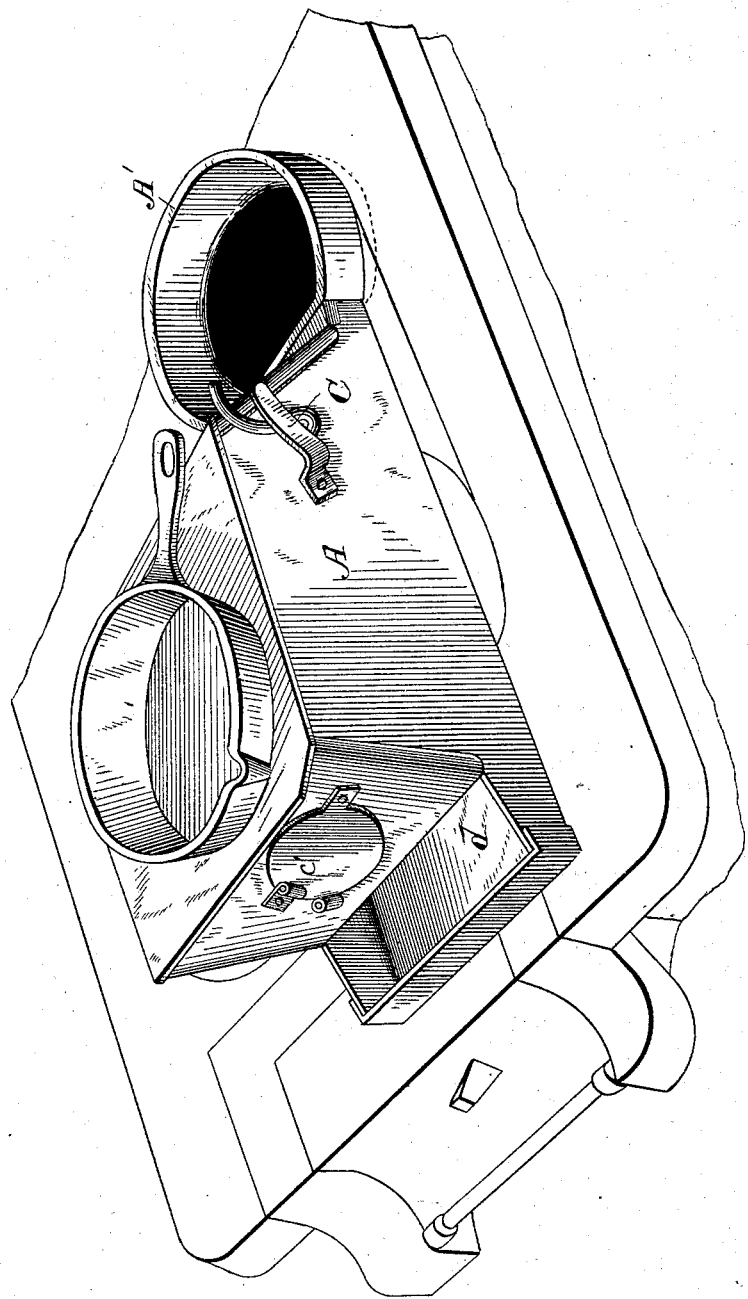

(No Model.) 3 Sheets—Sheet 1.

N. O. BOND.
COOKING STOVE.

No. 315,383. Patented Apr. 7, 1885.

WITNESSES
INVENTOR
Nathan O. Bond
By his Attorneys
Edson Bros.

(No Model.) 3 Sheets—Sheet 2.
N. O. BOND.
COOKING STOVE.
No. 315,383. Patented Apr. 7, 1885.
*Fig. 2.*
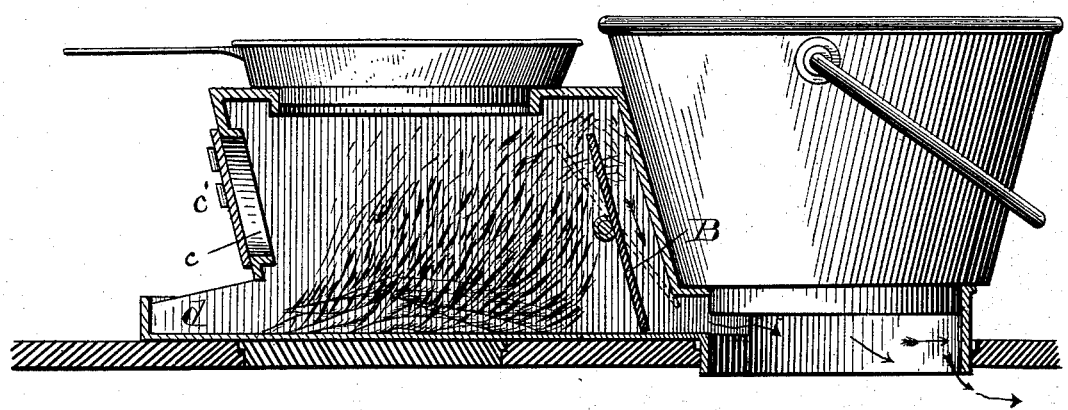
*Fig. 3.*
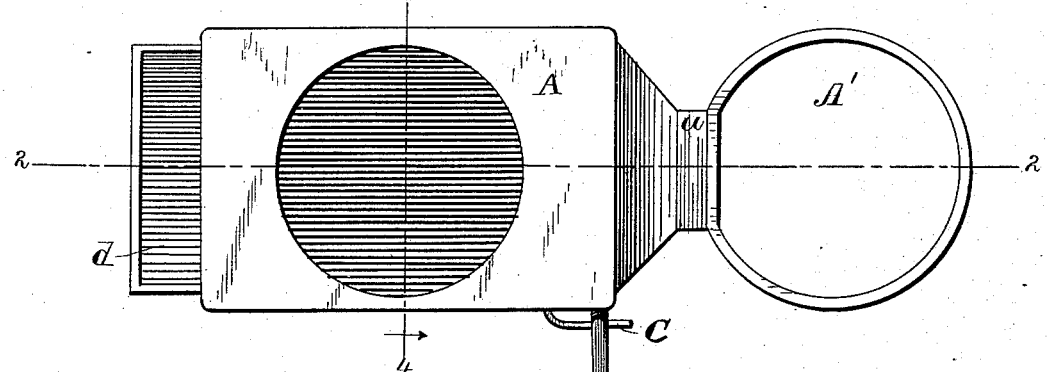
*Fig. 4.*
*Fig. 5.*
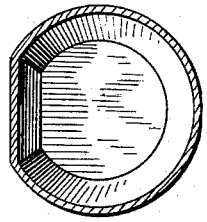 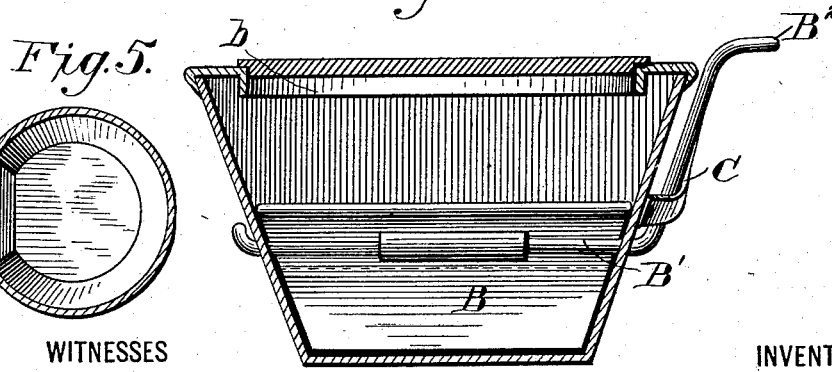
WITNESSES
INVENTOR
Nathan O Bond
By his Attorneys
Edson Bros.

(No Model.) 3 Sheets—Sheet 3.
N. O. BOND.
COOKING STOVE.
No. 315,383. Patented Apr. 7, 1885.
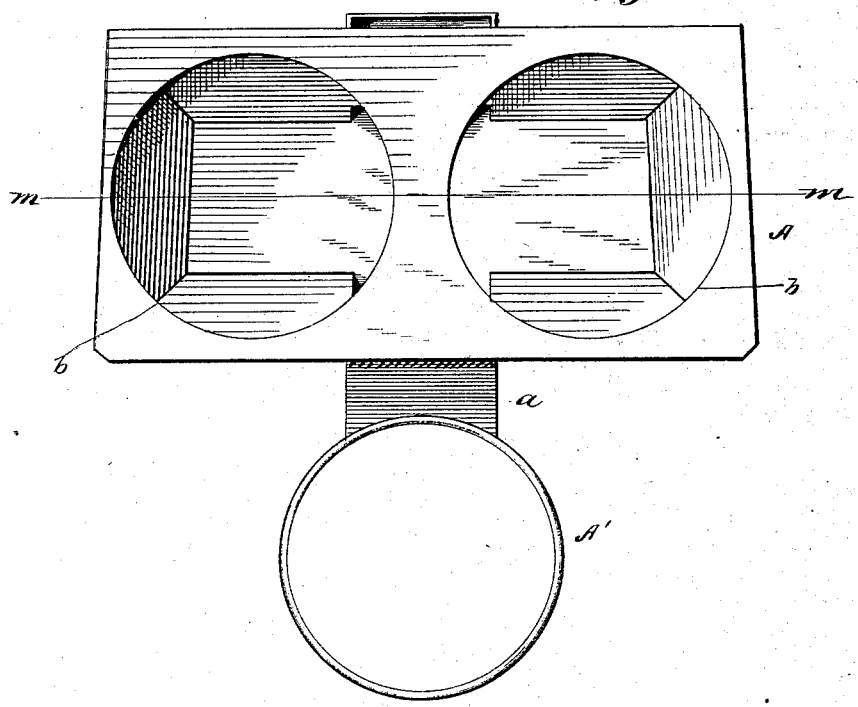
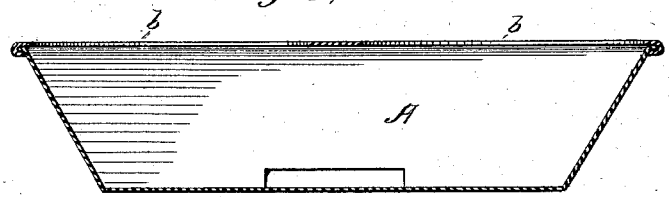

UNITED STATES PATENT OFFICE.

NATHAN O. BOND, OF WASHINGTON, DISTRICT OF COLUMBIA, ASSIGNOR OF TWO-THIRDS TO WILLIAM T. CRISWELL AND LOUIS C. PURMAN, BOTH OF SAME PLACE.

COOKING-STOVE.

SPECIFICATION forming part of Letters Patent No. 315,383, dated April 7, 1885.

Application filed February 7, 1885. (No model.)

*To all whom it may concern:*

Be it known that I, NATHAN O. BOND, a citizen of the United States, residing at Washington, in the District of Columbia, have invented certain new and useful Improvements in Cooking-Stoves, of which the following is a specification, reference being had therein to the accompanying drawings.

For greater convenience and facility in cooking, both as regards the amount of food or dishes that can be prepared and the time required to effect the cooking operation, as well as to provide for light housekeeping in the preparation of a meal, especially as desired during the summer or hot season, to avoid the excessive and dreaded heat which attends the ordinary method of cooking, while also promoting economy, is the object of this my invention, the same consisting of an attachment for a cooking stove of any flat-top design or pattern, said attachment having a combustion-chamber, with which is connected a flue-extension, said combustion-chamber having its rear heating-wall adapted to permit the cooking-vessel placed upon said flue-extension to rest against said wall. The said attachment is also provided, in addition to having a receiving-opening for a cooking-vessel, with a valve or damper adapted to cause the products of combustion to travel along the inner surface of the rear heating-wall, or to pass directly to the smoke-exit, without contact with said wall, while in both cases the said products of combustion are caused to act upon the bottoms of both of the cooking-vessels, all substantially as hereinafter more fully set forth, and pointed out in the claims.

In the accompanying drawings, Figure 1 is a perspective view of my attachment as applied for use to the top of a cooking-stove, parts or most of the latter being omitted. Fig. 2 is a longitudinal section taken on the line 2 2 of Fig. 3, also including a similar section of the stove-top of Fig. 1, with cooking-extension in place thereon. Fig. 3 is a plan view of my said attachment intact. Fig. 4 is a transverse section taken on the line 4 4 of Fig. 3, looking in the direction of the arrows, with a lid thereon and the damper extended only part way up. Fig. 5 is a cooking or culinary vessel with a portion of its surface flattened to especially adapt it to the outer surface of the front heating-wall of my attachment, as in the present instance shown. Fig. 6 represents a modified form of my invention, showing two openings at the top of the combustion-chamber. Fig. 7 is a section of Fig. 6 on the line *m m*.

In the embodiment of my invention as above outlined, I construct, preferably of sheet metal and oblong or other desired shape, a combustion-chamber, A, and as a continuation thereof a flue-extension, A', which is adapted to receive or to hold a cooking-vessel of the culinary style (its reduced bottom portion fitting in the opening thereof) and to fit into an opening of the stove, as shown in Figs. 1 and 2. The neck or uniting portions *a* between the two chambers may, as shown, be rectangular, and have an area of upper surface just sufficient to provide a support for that side of the bottom flange of the cooking or culinary vessel as seen in Fig. 2, while the rear heating-wall of the combustion-chamber A is adapted to permit that side of said vessel, whether the latter be of the form herein shown, as in Fig. 5, or otherwise, to be in contact with it from top to bottom, as seen also in Fig. 2, whereby the vessel, with its contents, will be more thoroughly and quickly heated than if simply exposed to the heat at its bottom.

In the upper part of the combustion-chamber A is also an opening, *b*, to receive another cooking utensil or vessel, more particularly for the meat or such other edibles as are similarly treated or cooked. The metal around the inner edge of said opening *b* may be caused to project downwardly, and thus form a flange thereat, as shown, while said opening may, when not in use, be closed by a suitable cover or top, as may also the opening *a* of the chamber A'.

In the front end of the combustion-chamber A is also an opening, *c*, which may be closed by door *c'*, pivoted or hinged and buttoned to said end of chamber, as shown, or otherwise, and through which opening the fuel is designed to be introduced into said chamber. The same (the front) end of the combustion-chamber A is extended at a point below and some distance beyond the door-opening, as at d, which extension d is left open at its upper side, as shown, to serve as an entrance for the draft to feed the products of combustion or fuel with the requisite amount of oxygen for combustion. The upper edges of the sides of said extension d may be inclined downwardly and rearwardly, while that part of the same end of the chamber A above said extension may incline inwardly and downwardly, thus serving, in a measure, to concentrate the external air and generate a draft.

B is a valve or damper—a straight plate—which is hung at its center by means of a rod, B', bearing in apertures in the sides of the combustion-chamber A, said damper or valve being disposed contiguously to the inner surface of the rear wall or end of the said chamber, and said rod having a crank-handle, B², for the convenient manipulation of the damper or valve. Preferably the rod B' may be connected to the damper B by passing said rod through and fixedly to a tubular socket or boss secured to said valve or damper, as shown.

The crank of the damper or valve-rod B is held as against accidental movement by means of a spring-catch, C, secured to the outside of the chamber A, and in position to permit the forcing of the said crank against said spring and be retained thereby as adjusted. It is obvious that by adjusting the damper or valve B so as to cause its lower end to rest upon the bottom of the combustion-chamber, as shown in full lines in Fig. 2, the products of combustion will be directed upward and caused to traverse the inner surface of the rear heating wall or end of said chamber, and thus transmit their heat to said wall, whence it will be communicated, as above intimated, to the cooking-vessel immediately in contact with said wall, thereby facilitating the cooking of the contents of said vessel.

When desired, or it is required to remove the action of the products of combustion from contact with said wall of the combustion-chamber, the damper or valve is adjusted to the dotted-line position, also seen in Fig. 2, causing the products of combustion to pass directly beneath the vessel in the chamber A' and into the smoke-exit.

From the foregoing it will be seen that the advantages and object above recited are fully borne out, and therefore no further reference thereto or summary thereof need here be given.

While I have described and shown the flue-extension as an annulus or ring, the latter may be made in the form of a rectangular chamber; also, at the lower outer edge of said annulus or ring may be secured a second flange to rest upon the stove.

The minor details of construction and disposition of parts may be varied without departing from the spirit of my invention.

Having thus fully described my invention, what I claim, and desire to secure by Letters Patent of the United States, is—

1. The combination, with the combustion-chamber of a portable furnace, of a flue-extension for supporting cooking utensils, having a downward opening, the wall of said chamber which adjoins the said extension rising above it at a suitable angle, whereby the side of a utensil placed upon the extension may abut against the same.

2. The combination, with the combustion-chamber of a portable furnace, of a flue-extension for supporting cooking utensils, the wall of said chamber which adjoins the said extension rising above it at a suitable angle, and a movable damper located a short distance in front of said rear wall, and extending across the combustion-chamber and from the bottom to near the top, whereby the products of combustion may be directed against the rear wall or permitted to pass directly to the extension-flue, as and for the purpose described.

3. The combination, with the combustion-chamber of a portable furnace, having an opening, of a flue-extension for supporting cooking utensils, the wall of said chamber which adjoins the said extension rising above it at a suitable angle, and a movable damper located a short distance in front of said rear wall, and extending across the combustion-chamber and from the bottom to near the top, whereby the products of combustion may be directed against the rear wall or permitted to pass directly to the extension-flue, as and for the purpose described.

In testimony whereof I affix my signature in presence of two witnesses.

NATHAN O. BOND.

Witnesses:
 JOS. FORREST,
 H. T. BERNHARD.